(12) United States Patent
Hayward

(10) Patent No.: US 8,745,230 B2
(45) Date of Patent: Jun. 3, 2014

(54) ADAPTATION OF SERVICE ORIENTED ARCHITECTURE

(75) Inventor: Geoffrey Hayward, Edmonton (CA)

(73) Assignee: DataGardens Inc., Edmonton (CA)

( * ) Notice: Subject to any disclaimer, the term of this patent is extended or adjusted under 35 U.S.C. 154(b) by 375 days.

(21) Appl. No.: 12/276,132

(22) Filed: Nov. 21, 2008

(65) Prior Publication Data

US 2009/0132708 A1    May 21, 2009

Related U.S. Application Data

(60) Provisional application No. 60/989,701, filed on Nov. 21, 2007.

(51) Int. Cl.
*G06F 15/173* (2006.01)
*G06F 15/16* (2006.01)

(52) U.S. Cl.
USPC .......................................... 709/226; 709/229

(58) Field of Classification Search
USPC ............................................ 709/225; 707/635
See application file for complete search history.

(56) References Cited

U.S. PATENT DOCUMENTS

| | | | |
|---|---|---|---|
| 7,203,944 B1 * | 4/2007 | van Rietschote et al. | 718/104 |
| 7,213,246 B1 * | 5/2007 | van Rietschote et al. | 718/1 |
| 7,720,796 B2 * | 5/2010 | Wong et al. | 707/639 |
| 7,783,601 B2 * | 8/2010 | Wong et al. | 707/635 |
| 7,788,665 B2 * | 8/2010 | Oshins | 718/1 |
| 2003/0187915 A1 * | 10/2003 | Sun et al. | 709/201 |
| 2006/0136490 A1 | 6/2006 | Aggarwal | |
| 2006/0155748 A1 | 7/2006 | Zhang | |
| 2007/0180436 A1 * | 8/2007 | Travostino et al. | 717/138 |
| 2007/0204265 A1 * | 8/2007 | Oshins | 718/1 |
| 2007/0204266 A1 * | 8/2007 | Beaty et al. | 718/1 |
| 2007/0220121 A1 | 9/2007 | Suwarna | |
| 2007/0233698 A1 | 10/2007 | Sundar | |
| 2007/0266383 A1 * | 11/2007 | White | 718/1 |
| 2009/0113109 A1 * | 4/2009 | Nelson et al. | 711/6 |
| 2009/0199177 A1 * | 8/2009 | Edwards et al. | 718/1 |

OTHER PUBLICATIONS

Fu et al., "Service migration in distributed virtual machines for adaptive grid computing"; International Conference on Parallel Processing; Jun. 14-17, 2005.*
"Reldata San-level Snapshots: Getting a Business Return from Snapshots," Reldata, Dec. 2006 <http://reldata.com/resources/whitepaper> pp. 1-9.

* cited by examiner

*Primary Examiner* — Oscar Louie
*Assistant Examiner* — Lin Liu
(74) *Attorney, Agent, or Firm* — Christensen O'Connor Johnson Kindness PLLC

(57) ABSTRACT

An architecture and method are provided for provisioning, configuring and deploying adaptive service oriented architectures through mounting provider systems on extended service containers and manipulating the instantiations of these containers so that the active instantiations can be optimized for the prevailing state within the service oriented architectures.

8 Claims, 6 Drawing Sheets

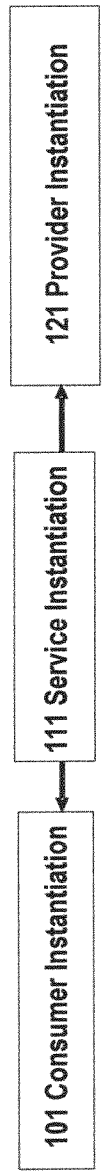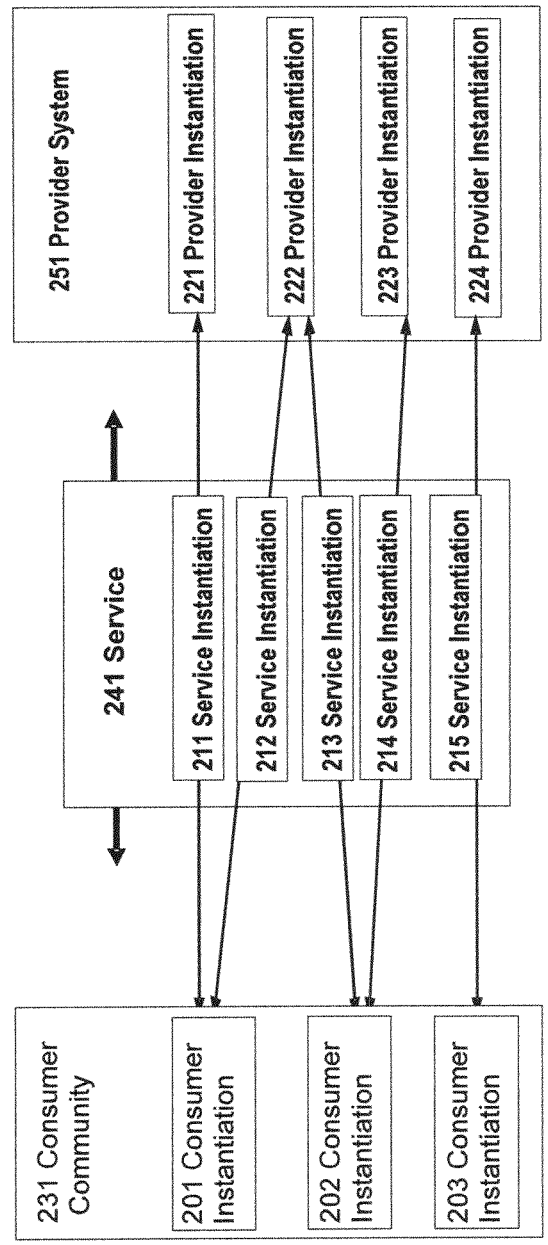

ADAPTATION OF SERVICE ORIENTED ARCHITECTURE

TECHNICAL FIELD

The present disclosure is related to the fields of service oriented architectures, grid computing, web-services and utility computing, in particular, to methods for adaptive manipulation of a systems constructed from a common pool of virtual and physical resources with intent to optimize the delivery of a set of services to a fabric of consumers.

BACKGROUND

Modern data centres offer many distinct information technology ("IT") services to many different groups of users with highly variable needs. If each service is deployed on a distinct set of IT resources, the average utilization of those resources tends to be low. Here, a "resource" might be any physical or logical entity that is used in the delivery of a service (e.g., CPU cycles, memory, storage, bandwidth, software licenses, data sets, etc.) An alternative is to deploy the requisite set of services on a shared fabric of resources. Indeed, several inter-related fields of computer science—service oriented architectures ("SOA"), grid computing, utility computing and web-services—all address strategies for more effectively delivering multiple services by sharing IT resources between them.

Common methods of providing an adaptive SOA can involve managing or "orchestrating" the allocation of a shared set of resources between different services. Yet, frequently, such methods of "resource orchestration" have serious practical shortcomings. For instance, significant delay may be necessary before a resource reallocated from one service to another can actually be used. It is often necessary to download, install, configure and activate new software applications, a different operating system and requisite data sets before a reallocated compute node can be used. In cases where business continuance is a priority, the resulting delay can have serious consequences. Another shortcoming of conventional resource orchestration is that it can seriously undermine the stability and optimization of clustered systems, which frequently exhibit complex and subtle resource dependencies. Further, resource orchestration may present serious security challenges that would not otherwise arise. Resources subject to reallocation may transfer between different trust domains and the services to which they are assigned may have different access privileges (e.g., to protected data sets or network zones).

To better understand the challenges associated with conventional methods of resource orchestration, consider a specific example. Suppose that an e-mail service and clustered file system service are both deployed on a shared SOA fabric. Suppose that under normal circumstances the e-mail service deploys two physical hosts as e-mail servers: one of which is active and the other is a hot stand-by. Meanwhile, the clustered file system is normally deployed on three active physical hosts. There are no other servers available in the SOA fabric.

Now suppose that one of the hosts for the clustered file system fails and the resource orchestration policy dictates that the stand-by e-mail server be reallocated to the clustered file system service. The reallocation triggers a complex sequence of events.

First, the stand-by server must be decommissioned as part of the e-mail service. This may provoke changes in the configuration of the e-mail server cluster, deactivation of a higher-level cluster failover service, changes in the configurations of network zones and perhaps several other changes as well. Next, the reassigned server must be commissioned, configured, and activated as part of the file system cluster. This may necessitate: provisioning a new operating system, downloading and installing file system software, registering the server as part of the file system cluster, mounting new volumes associated with data and metadata for the file system, setting new policies for cluster fail-over, quorum, network partition management, and nomination of stand-by master servers for the cluster, reconfiguring host bus adapter multi-path and failover policies, and re-configuring network zones, port-bindings, LUN masking settings, and routing tables.

Clearly, this complex sequence can leave the SOA vulnerable to a host of system-level challenges. Further, throughout the time that the host is being reassigned from one service to the other, the entire SOA is in even a more severely degraded mode of operation than resulted from the original failure condition. Specifically, during the de-commissioning and re-commissioning process, two servers are out of active duty rather than just one.

Often the costs associated with dynamic resource orchestration outweigh the benefits. In consequence, many organizations continue to offer information services on static "silos" of physically or logically isolated information technology ("IT") systems. Such static architectures cannot respond to the changing conditions of a modern data centre and, hence, are often sub-optimal.

It is, therefore, desirable to provide an architecture and methodology for manipulating pre-configured virtualized system containers in such a way that an SOA can adapt to changing environmental conditions without any need for reallocating resources across container boundaries.

SUMMARY

An architecture and method are provided for the dynamic optimization of service oriented architecture. In one embodiment, the architecture and method rely on preconfiguring "extended service containers" and manipulating the sets of resources within these containers that are actively engaged in service provision at any given time. Dynamic optimization can be achieved by classifying the environmental state conditions for the SOA (e.g., with respect to traffic load, distribution of load, resource availability, etc.) and adjusting the instantiations of the extended service containers accordingly.

Thus, in one embodiment, there is provided a method of adapting a service oriented architecture comprising at least a first provider system. The method may comprise: providing at least two instantiations of the at least a first provider system, with only one of the at least two instantiations being active at any one time; and adapting the service oriented architecture by transitioning between the at least two instantiations. The service oriented architecture may further comprise at least a second provider system with infrastructure shared between the providers systems, and the method may further comprise: providing at least two instantiations of the at least a second provider system, with no more than one of the at least two instantiations being active at any one time; and adapting the service oriented architecture by transitioning between the at least two instantiations of one or more of the provider systems.

In a further embodiment, there is provided a method of coordinating transitions between instantiations of two or more distinct extended service containers. The method may comprise identifying active resources and corresponding replica resources within two or more distinct extended service containers including at least a source extended service container and a target extended service container; transmitting selected changes made to an active resource within the source extended service container to a replica resource of the active resource within at least the target extended service container; and applying the selected changes to the replica resource within at least the target extended service container.

Further embodiments are to be found in the description and claims, the claims being incorporated here by reference.

BRIEF DESCRIPTION OF THE DRAWINGS

Embodiments of adaptation of service oriented architecture will now be described by way of example, with reference to the figures, in which:

FIG. 1 is a block diagram depicting the relationship between instantiations of a consumer, a service, and a provider.

FIG. 2 is a block diagram depicting the relationship between a consumer community, a service, and a provider system. Each can be identified with an equivalence class of constituent instantiations. The constituents are connected through service instantiation relationships at a lower level of abstraction.

DETAILED DESCRIPTION OF EMBODIMENTS

Figure 3:
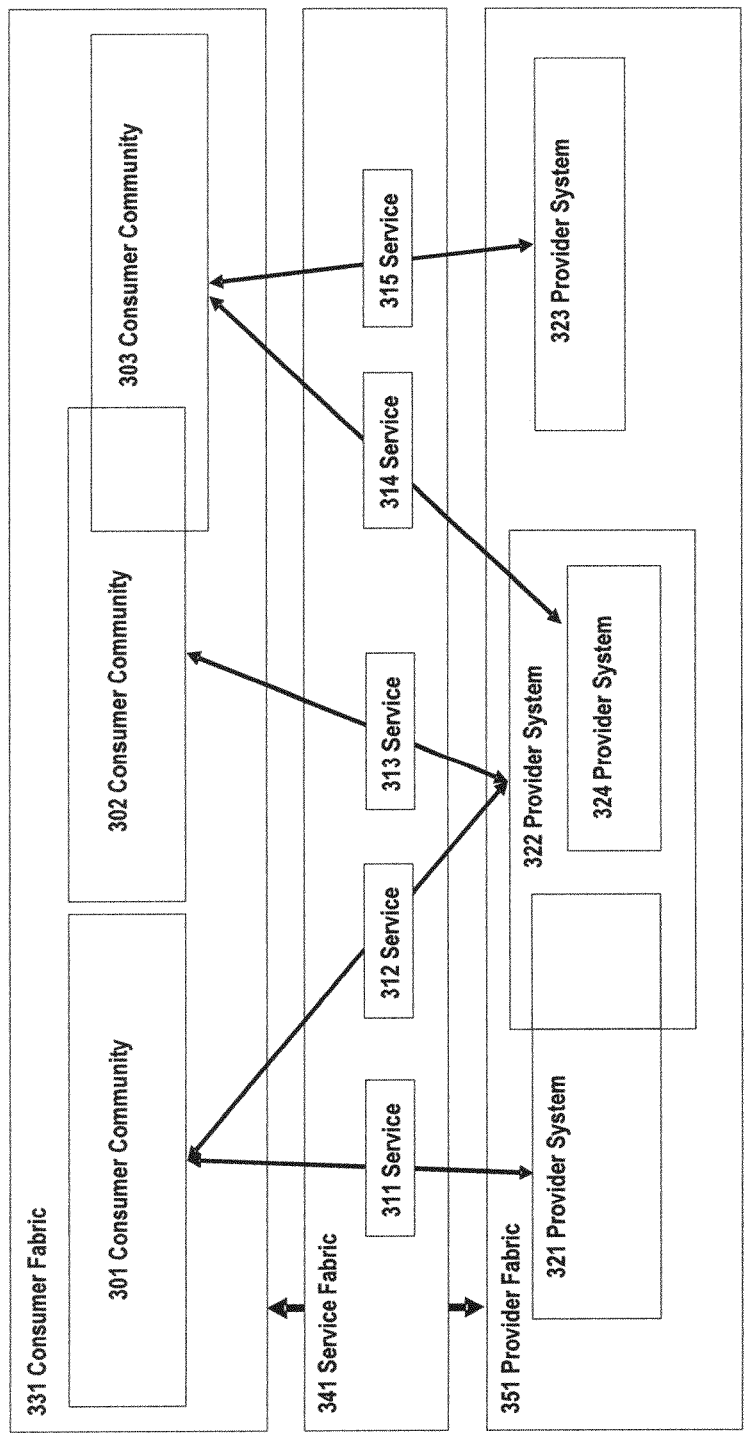
FIG. 3 is a block diagram depicting a service oriented architecture used throughout this disclosure. A set of one or more consumer communities receives services from a set of one or more provider systems. The set of all consumer communities that interact with provider systems through the SOA is defined as the "consumer fabric". Similarly, the set of all provider systems that provide service on the SOA is defined as the "provider fabric". The set of all services exchanged on the SOA is defined as the "service fabric".

An architecture and method are provided for provisioning, configuring, and deploying adaptive SOAs through orchestrating "active instantiations" of "Extended Service Containers" in response to changing state for the SOA.

This disclosure is presented in the context of the dyadic structure often presupposed in service oriented architectures. This structure can involve logical entities called "services" where every service can be viewed as an exchange or set of exchanges between a service "provider" and a service "consumer" which results in some utility to the consumer. The consumer and provider of any given service are understood to be logically distinct, non-overlapping entities. Nonetheless, the consumer of one service can be a provider of some other service. In further embodiments, it can be the case that a consumer/provider pair with roles defined relative to one service has reversed roles with respect to some other service. Depending on the context, a service, a consumer and a provider can each be decomposed into smaller constituents. The granularity of what is considered to be a "service", "consumer" and/or "provider" is contextual and usually depends on an understanding of the atomicity of "utility" provided to the consumer.

The methodologies of this disclosure lie at the convergence of a number of fields of inquiry and technological development including: Service Oriented Architectures ("SOAs"), grid computing, utility computing, web-services, service virtualization and distributed computing. Since several of these fields are still in their formative stages of development, it is not surprising that key terms related to this disclosure are used in different ways by various experts. For the purposes of this specification, the following terms have the definitions outlined below—many of which are based on the Open Grid Services Architecture Glossary of Terms Version 1.5:

Resource: A distinct entity that is accessed as part of process of providing a given service within an SOA fabric. The term often denotes logical or physical entities that are pooled (e.g. hosts, software licenses, IP addresses) or that provide a given capacity (e.g. disks, networks, memory, databases).

Service: A distinct and identifiable utility provided to a set of requesters through an SOA.

Provider System: A set of resources that is responsible for providing a given service within an SOA.

Resource configuration: The process of adjusting the presentation of a resource to meet the requirements of a specific service or set of services. For our purposes, a change in a resource that does not necessitate re-labelling with some new identifier or address will be interpreted as a reconfiguration of a single resource rather than the decommissioning of one resource and provisioning of another.

Resource allocation: The process of assigning a set of resources to a provider system for use in providing a service.

Active resource set: The set of resources actively engaged in the delivery of a service.

Provider System Instantiation: A unique manifestation of a provider system, which may have logical and/or physical attributes. For our purposes here, instantiations are differentiated from one another if they have different active resource sets.

Extended Service Container ("ESC"): A set of instantiations of a provider system within the SOA. We often identify an ESC with a subset of provider system instantiations specifically selected for consideration by administrators and/or users of the SOA.

Resource ensemble: The set of all resources (logical and/or physical) that are actively engaged in one or more instantiation of a given ESC.

Transition ensemble of an ESC: A set of changes, and in some cases, the set of all possible changes, between initial and final instantiations of the ESC. Similarly, the transition ensemble for the SOA as a whole is a set of transitions, and in some cases, the set of all possible transitions, between initial and final instantiations of the SOA.

Broadly stated, a method is provided that involves adapting an SOA by changing the instantiations of its provider systems. Adaptations can be achieved by transitioning between pre-provisioned, pre-configured and pre-tested service instantiations known to meet certain service level objectives ("SLOs"). Transitions between service instantiations for provider systems can typically be effected merely by exposing or veiling resources already within the resource ensembles for the ESCs. In one embodiment of this methodology, the resource ensembles for the provider systems can remain static: changes can occur only in the active resource sets engaged at any given time. In this fashion, adaptation of the SOA can be achieved without resources transferring across provider system boundaries. Further, adaptation of the SOA does not require resources to be provisioned (e.g., with software, operating systems, or data) or configured at the time of adaptation. In addition, the provider systems are not de-stabilized through the process of adaptation: both the initial and final instantiations of the provider systems are already tested and well understood. Equally important, the set of transitions between the initial and final instantiations of the SOA have also been tested and are known to be stable.

In another embodiment, one method can incorporate schemes for classifying actual conditions within an SOA into a discrete array of states: the "nominal state" as well as one or more "stress states". Different instantiations of the provider systems can be monitored under test conditions characteristic of each SOA state. In one embodiment, the provider systems can be selected for each SOA state by monitoring service levels under the test conditions and comparing them to prescribed SLOs.

In another embodiment, a policy management module ("PMM") can be provided to maintain a registry with information about various embodiments of each SOA state and expected service levels for these embodiments. In another embodiment, policies can be prescribed in the PMM to determine criteria by which the actual conditions of the SOA are classified into one of the prescribed SOA states. The PMM can also maintain and execute policies by which a transition from one instantiation to another can be initiated. These policies can be further tested relative to all possible transitions. After this testing is complete, the PMM can be engaged on a production SOA.

In one embodiment, the PMM can effect change between instantiations of provider systems by exposing and/or veiling resources already within the relevant resource ensembles in a controlled fashion. This methodology can be designed to leverage the ability of SOA provider systems to respond elegantly to the disappearance and re-appearance of individual resources within their resource ensembles. In a representative embodiment, all resources can be registered in the resource ensemble with the relevant provider system registries. In this embodiment, the disappearance/re-appearance of any given resource can be interpreted as a resource failure/recovery and, hence, can trigger normal cluster fail-over/fail-back procedures. So long as the PMM can initiate the transitions between active resource sets in a controlled and predetermined fashion, the SOA provider systems can execute automated and elegant transitions from one instantiation to another.

In further embodiments, to ensure optimal transitions across the entire SOA, the PMM can coordinate simultaneous changes of instantiation across multiple provider systems within the SOA.

FIG. 1 illustrates the fundamental dyadic relationship presupposed in a service-oriented model. In this model, a "service" is exchanged between two logically distinct entities: a "consumer" and a "provider". In some cases, a "service" can be understood abstractly as an equivalence class of exchanges between a set of "consumers" and a set of "providers". To avoid confusion, we refer to a "service instantiation", "consumer instantiation" and "provider instantiation" when the intent is to reference individuated exchange between specific logical entities. FIG. 1 depicts a service instantiation 111 exchanged between a consumer instantiation 101 and a provider instantiation 121.

By contrast, FIG. 2 depicts an abstract conception of a service. Here, a set one or more consumer instantiations 201, 202, 203 of consumer community 231 exchange service instantiations 211, 212, 213, 214, 215 of service 241 with one or more provider instantiations 221, 222, 223, 224 of provider system 251. With respect to a certain level of abstraction, all service instantiations depicted in FIG. 2 are understood as equivalent and can represent a single abstract "service". Here we define a "consumer community" to be a set of consumer instantiations which are understood as an equivalence class with respect to a given service. Similarly, we define a "provider system" as the set of provider instantiations, which constitute an equivalence class with respect to a given service.

FIG. 3 depicts one the model of a service oriented architecture used throughout this disclosure. A set of one or more consumer communities 301, 302, 303 of a consumer fabric 231 receives services 311, 312, 313, 314, 315 of a service fabric 302 from a set of one or more provider systems 321, 322, 323, 324 of a provider fabric 351. The consumer community for one service can "overlap" with the consumer community for another. The equivalence class of consumer instantiations with respect to one service can share some or all of its members with the equivalence class of consumer instantiations defined with respect to another service. Similarly, provider systems for different services can be constructed from overlapping sets of logical or physical resources.

In FIG. 3, the set of all consumer communities that interact with provider systems through the SOA is defined as the "consumer fabric". Similarly, the set of all provider systems that provide service on the SOA is defined as the "provider fabric". The set of all services exchanged on the SOA is defined as the "service fabric".

Figure 4:
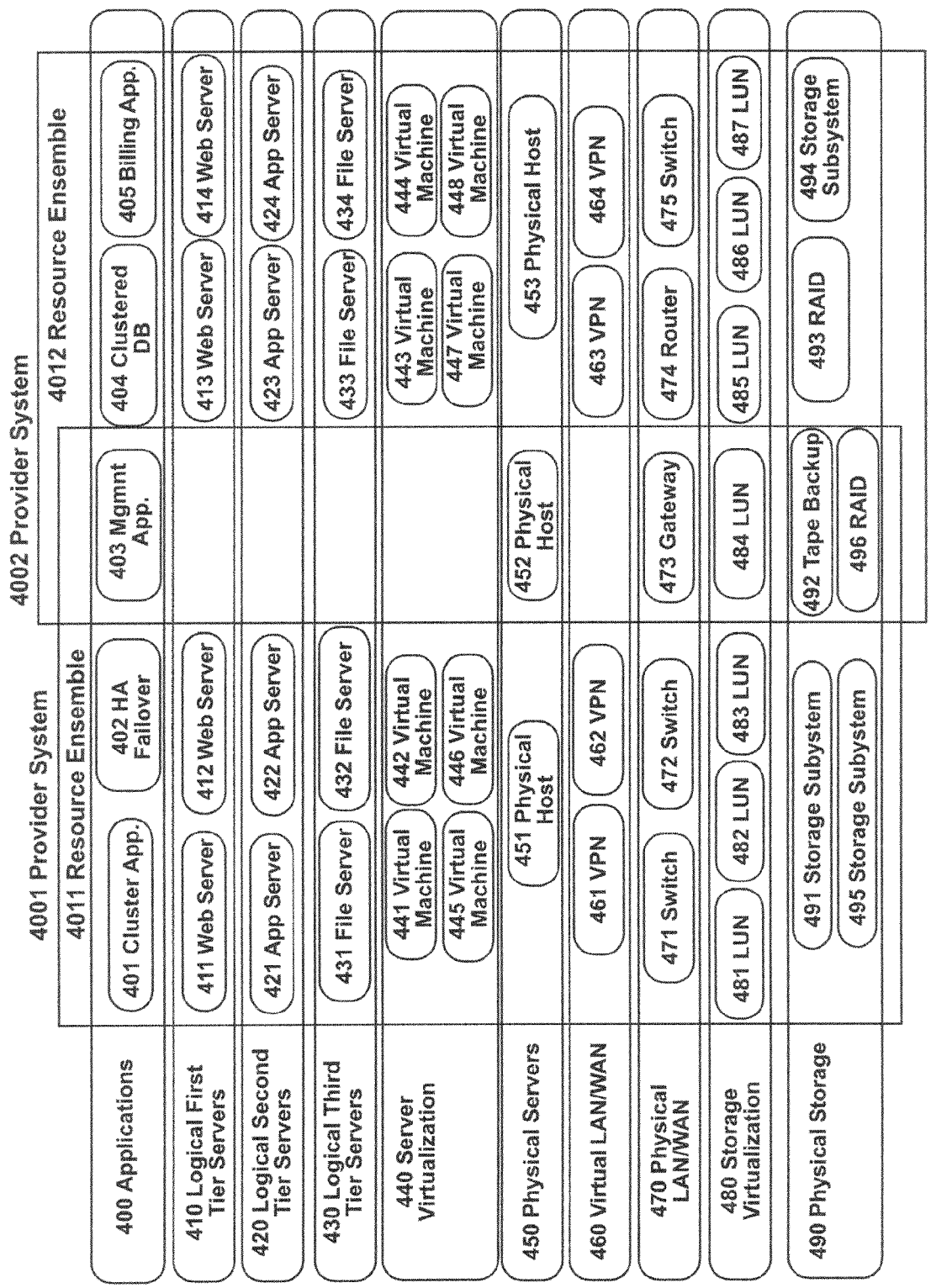
FIG. 4 is a block diagram depicting resource ensembles associated with two distinct provider systems. In this case, some virtual and physical resources from the two ensembles overlap. Different subsets of the two resource ensembles are actively engaged in different instantiations of the provider systems.

FIG. 4 depicts an embodiment having two provider systems, 4001 and 4002, which can leverage some shared resources. The resource ensembles for the two provider systems, 4011 and 4012 respectively, illustrate the maximal sets of resources that may be active in different instantiations of the provider systems. In this case, resources 403, 452, 473, 484, 492 and 496 are members of both resource ensembles. Depending on which instantiations of the provider systems are active at any given time, these resources may or may not be active in both provider systems simultaneously.

Figure 5:
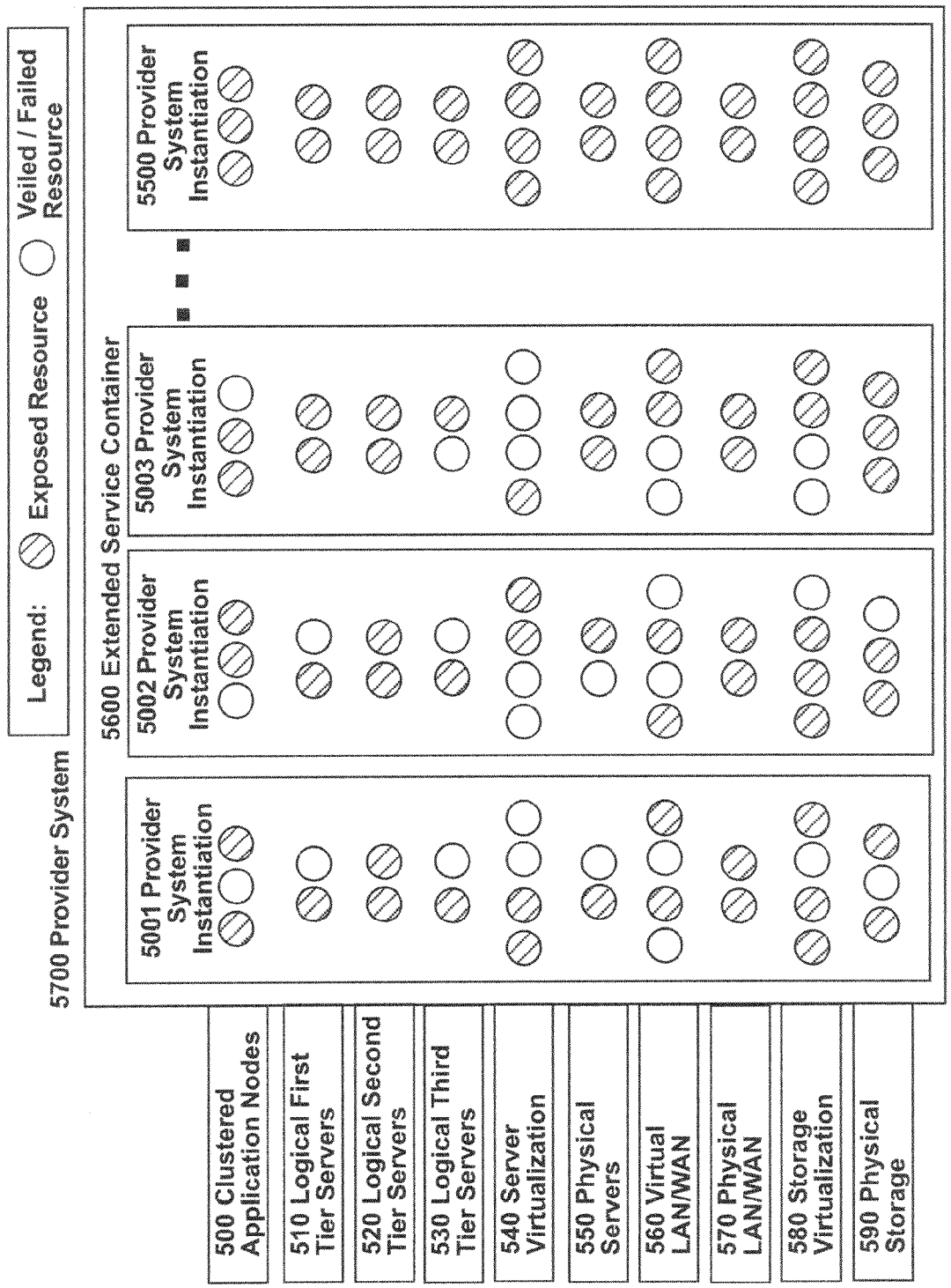
FIG. 5 is a block diagram depicting a sample Extended Service Container ("ESC") for a given provider system. The ESC is the set of all instantiations of the provider system that can be active in the SOA. For our purposes, each distinct instantiation is characterized by having a different set of logical and/or physical resources engaged in providing the relevant service.

FIG. 5 portrays an embodiment having a provider system 5700 and an associated Extended Service Container 5600. In this embodiment, the Extended Service Container includes a set of preferred and pre-configured instantiations of the provider system 5001 through 5500. In each instantiation, a different set of resources, 500-590, is actively engaged in providing the service. Resources that are not engaged in the instantiation can be veiled from clustered systems that compose the provider system. In certain embodiments, the set of instantiations included in the Estended Service Cluster can be determined by a methodology illustrated in FIGS. 6 and 7.

Figure 6:
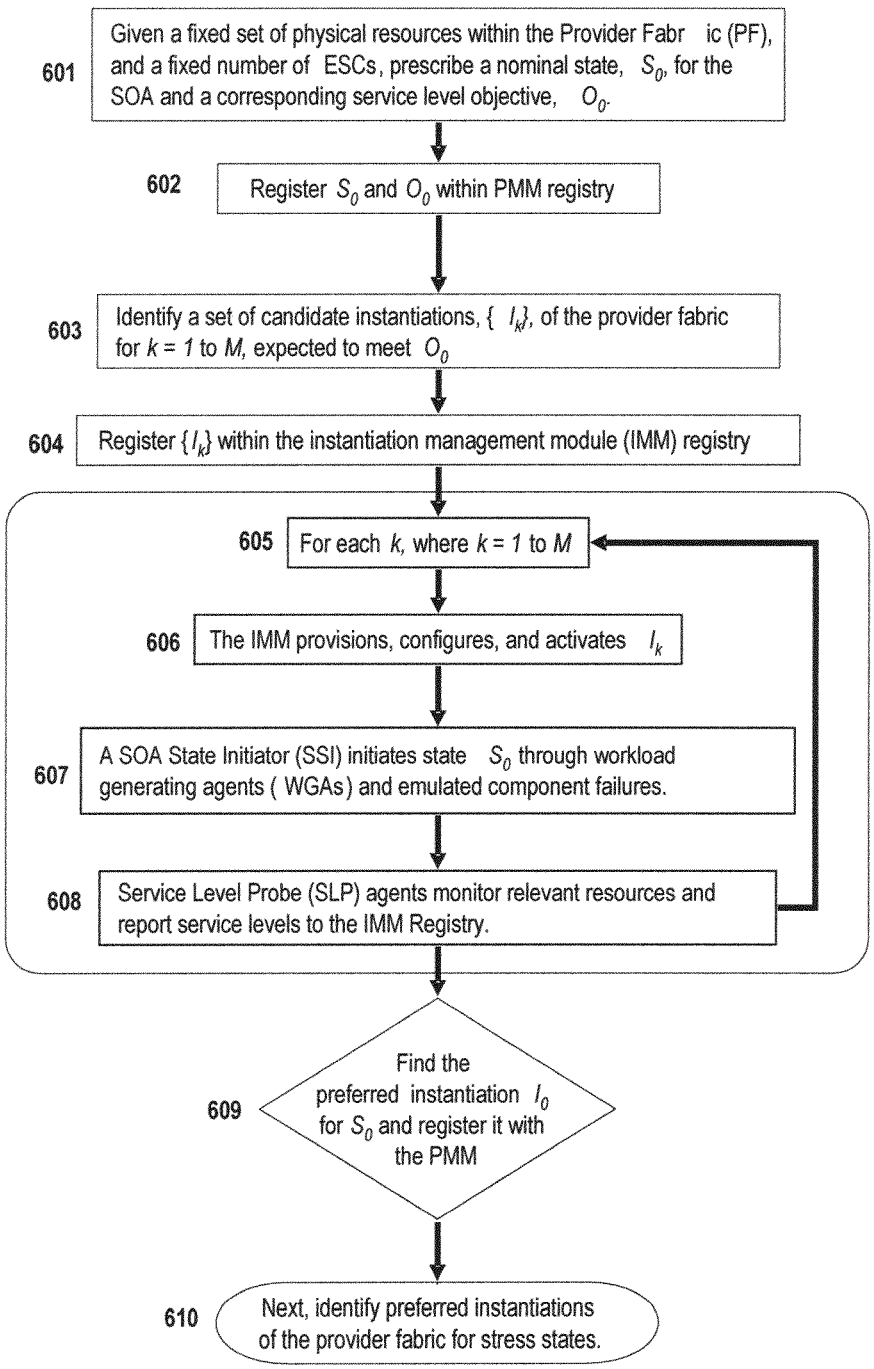
FIG. 6 is a flowchart depicting a sample algorithm for identifying a preferred instantiation of a provider system given a certain characterization of the nominal state for the SOA.

FIG. 6 depicts a sample methodology for provisioning an instantiation of the provider fabric for a given SOA under conditions classified as 'nominal'.

In step 601, the administrator prescribes a nominal state, $S_0$, for the provider fabric. The prescription can include a specification of a set of services, consumer communities, workloads and workload variances, Extended Service Containers ("ESCs"), and service level objective ($O_0$) that characterize the SOA under nominal conditions. Note that $O_0$ can, in fact, be a higher-level aggregation of an array of SLOs associated with different ESCs.

In step 602, the nominal state and the nominal SLO can be registered with a policy management module (PMM). Within this module, discriminants can be defined and used to classify the actual conditions associated with the SOA into either the nominal state or one of a set of discrete and pre-defined "stress states". The PMM registry can also maintain information about the SLOs associated with each state. By comparing actual service levels to these SLOs, the PMM can determine whether to initiate a transition from one set of ESC instantiations to another.

In step 603, the administrator can, either through an automated process or through a manual one, identify a set of candidate instantiations of the provider fabric, $\{I_k\}$ (where k=1 to M). For each instantiation, service levels can be measured under the nominal state $S_0$. In step 604, the candidate instantiations can be registered with an instantiation management module (IMM), which can be used to provision, configure and activate them under the nominal state $S_0$.

In steps 605 through 608, each candidate instantiation can be evaluated under the nominal state for the SOA. In step 606, the IMM can provision, configure and activate a given candidate instantiation. In step 607, an SOA state initiator ("SSI") service initiates nominal state $S_0$. This can include, for example, triggering a set of workload agents to initiate a specific set of test workloads. In step 608, a set of service level probe ("SLP") agents monitor resource performance and report back to the IMM where the attained service levels for candidate instantiation can be recorded.

In step 609, an instantiation for the provider fabric can be identified and registered with the policy management module.

Figure 7:
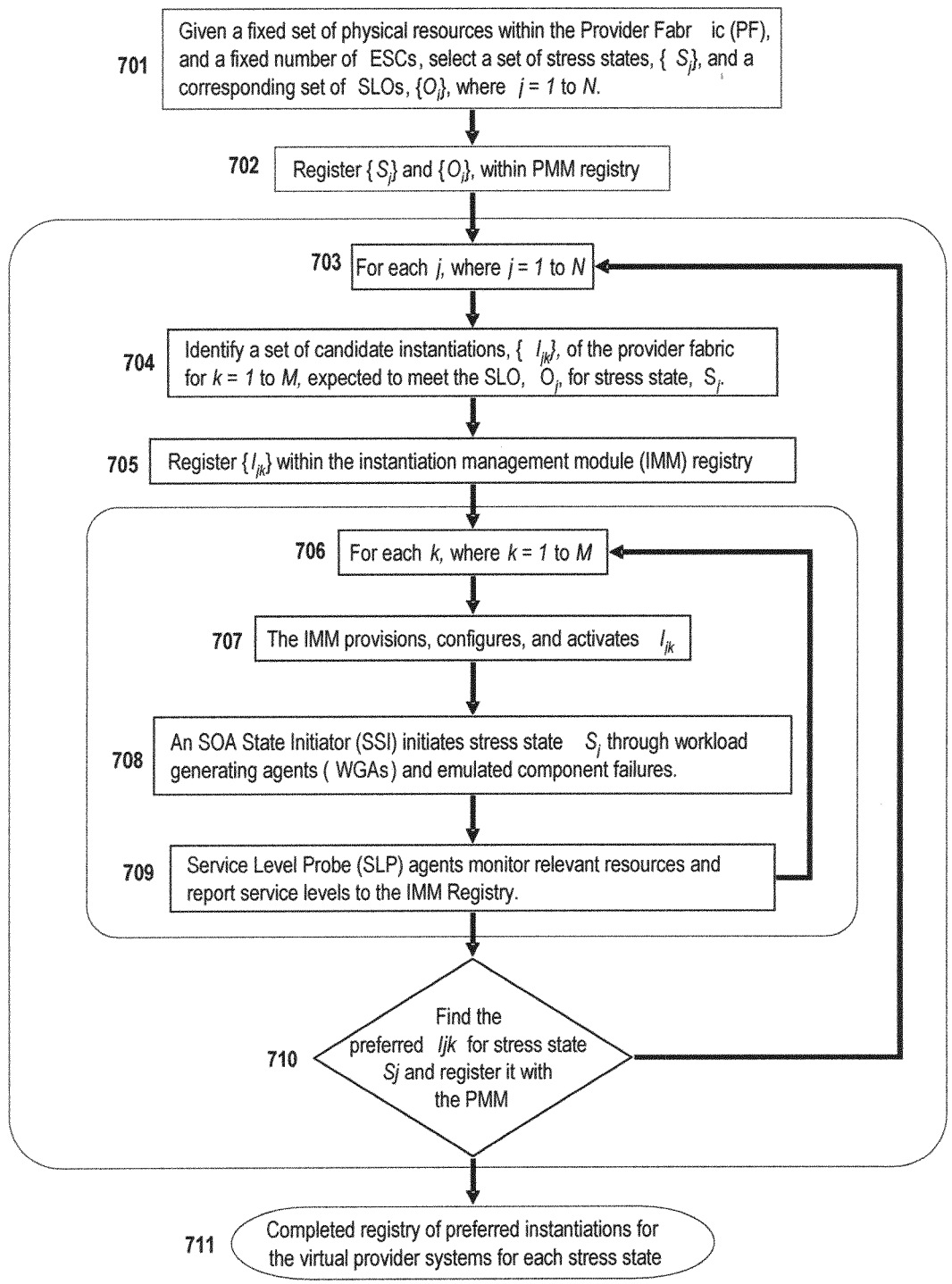
FIG. 7 is a flowchart depicting a sample algorithm for identifying preferred instantiations of provider systems given a characterization of a set of "stress states" for the SOA.

FIG. 7 depicts a sample implementation of an algorithm for provisioning instantiations of the virtual provider systems for each stress state.

In step 701, the administrator can select a set of representative stress states for the provider fabric. These stress states can correspond, for instantiation, to a set of most commonly occurring scenarios under which the resources of the provider fabric can be placed under stress and, therefore, may not be able to meet the required SLOs. Stress states can be induced, for example, due to: variance in the workload initiated by one or more consumer community, variance in the correlation between workloads of different consumer communities, physical or virtual resources within the provider fabric either failing or transitioning into a degraded mode of operation.

The stress states, $\{S_j\}$, together with a corresponding set of service level objectives, $\{O_j\}$, can be registered with a policy management module ("PMM"). Note that the service level objective for a given stress state can be different from the nominal service level objective if, for instantiation, the administrator is willing to tolerate a degraded level of service during times that a particular stress state persists. Further, note that, as with the nominal state, the 'service level objective' for a given stress state can, in fact, refer to a complex set of service objectives associated with different virtual provider systems within the provider fabric.

Steps 703 through 710 embody a sample process for selecting preferred instantiations of the virtual provider systems (and, hence, the provider fabric) that can meet the service level objectives $\{O_j\}$ under stress states $\{S_j\}$. In step 704, the administrator can, either through an automated process or through a manual one, identify a set of candidate instantiations $\{I_{jk}\}$ of the provider fabric (where k=1 to M) for which service levels can be measured under stress state $S_j$. These candidate instantiations can be registered with an instantiation management module (IMM), which can be used to provision, configure, and activate them under the stress state $S_j$.

In steps 706 through 709, each candidate instantiation can be evaluated under stress state $S_j$. In step 707, the IMM can provision, configure and activate a candidate instantiation. In step 708, a stress state initiator ("SSI") service can initiate stress state $S_j$. This can include, for example, triggering a set of workload agents to initiate a specific stress state workload and/or deactivating certain resources to emulate failure of physical or virtual resources. In step 709, a set of service level probe (SLP) agents can monitor resource performance and report back to the (IMM) where the attained service levels for candidate instantiation can be recorded.

In step 710, an instantiation (i.e., of the virtual provider systems and, hence, the entire provider fabric) can be selected by referencing the service levels registered for each instantiation within the IMM registry.

Steps 703 through 710 can be repeated for each stress state until a set of preferred instantiations, $\{I_{jp}\}$, for stress states $\{S_j\}$ has been selected.

EXAMPLE EMBODIMENTS

Below we describe some example embodiments of the architecture and method described above.

Example 1

Virtual Machine Migration between Distinct Clusters

In this example an IT administrator wishes to "migrate" a resource between two distinct clusters through the method of ESC adaptation described above. The "migration" of the resource may be initiated manually (e.g., as part of a remote office provisioning process); initiated automatically (e.g., through a PMM in response to recognition that the multi-cluster SOA is in some stress state); or initiated semi-automatically according to some other set of circumstances. In this example, the resource we choose to "migrate" between the distinct clusters is a virtual machine ("VM"), however, we could equally migrate software executables, logical volumes, data, file systems, databases or any other IT resource that can be leveraged by the source and target clusters. The source and target clusters may be in different sites (potentially separated by thousands of kilometers or more). They may be on different IP subnets within different trust domains (e.g., they may be isolated from each other by distinct firewalls).

In this example, we export a shared or replicated logical disk to both the source and target clusters and mount the VM image on this logical disk. Note that this shared or replicated logical disk may leverage any one of a number of block-level technologies including shared access to a single physical disk image through a storage area network ("SAN"), shared access to two or more fully active mirror copies through a clustered block system, access to active/passive block-level replicas accessible from both clusters with a forced transition of the active replica at the time of "migration", independent access from each cluster to distinct physical or logical (e.g., copy-on-write) replicas, or any other strategy that can ensure that both $VM_S$ and $VM_T$ map to a mutually consistent data image at the time of "migration".

In both the source and target clusters, we can pre-provision and register a virtual machine that corresponds to the consistent data image. For clarity, label the VM registered in the source cluster "$VM_S$" and label the VM registered on the target cluster "$VM_T$". As we have noted, $VM_S$ and $VM_T$ share a consistent data image and correspond to the same logical VM at the time of "migration". Nevertheless, $VM_S$ and $VM_T$ are registered on two distinct clusters. Depending on whether there is an inter-cluster locking mechanism and federated registry of resources, the two cluster management systems may or may not be aware that $VM_S$ and $VM_T$ share a consistent data image. Correspondingly, the VM may or may not be registered as a logically distinct VM within each cluster.

For the sake of definiteness in this example, let us further presume that the source and target clusters are in no way subsumed under a federated global cluster. In this case, to prevent de-coherence, only one of $VM_S$ and $VM_T$ may be active at any given time. Prior to VM "migration", $VM_T$ is deactivated or "veiled" on the target cluster. This "veiling" can be achieved through any of a number of different mechanisms. Depending on the nature of the cluster software and its methodology for managing isolation events, one veiling strategy may be preferred over others. Veiling might be achieved, for example, by fencing $VM_T$ (e.g., by de-activating the relevant switch port or network interface card), suspending $VM_T$ through the target cluster's management system or suspending the $VM_T$ guest operating system. Even though $VM_T$ is not visible to the target cluster, it continues to be registered on the cluster and can re-join the cluster through an automated process once it is un-veiled.

To initiate the VM "migration" from $VM_S$ to $VM_T$. we can: quiesse applications running on $VM_S$, suspend, fence, or otherwise "veil" $VM_S$, and flush the $VM_S$ active state and any data cached in the host through to the logical disk.

To some extent, the temporal sequencing of steps 2 and 3 depend on the "veiling" strategy selected. Ultimately, the requirements are to ensure that the data image for $VM_S$ is in a current and suitably point-in-time consistent (e.g., at the level of the applications, file system, business processes, etc.) state when it is "veiled" from the source cluster.

Once the portion of host cache related to active state and data for $VM_S$ is flushed to the shared logical disk, we can then update and "un-veil" $VM_T$ within the target cluster. Depending on the block-level strategy used for maintaining the consistency of the common data image for $VM_S$ and $VM_T$, it may be necessary to promote the target cluster's replica from a passive to active state, and/or re-export the disk image on the target cluster. We can then force a fresh scan of the data image on the shared/replicated logical disk by the target host or HBA. Finally, we "un-veil" the updated $VM_T$ within the target cluster.

By this method, we are able to logically "migrate" a VM resource between two distinct clusters that may have been mounted within different ESCs (e.g., on different subnets, in different geographic sites, and/or within different trust domains) without having to un-register and re-register the resource at the cluster level and without having to transfer it across ESC boundaries. Rather, the method involves unveiling and veiling source and target resources that persist logically within their respective clusters both before and after the resource "migration". In this particular example, there is a special requirement that the SOA adaptation be achieved while maintaining consistency of the data image for the resource before and after "migration". In this example, this requirement was met by virtue of the fact that source and target ESCs had access to consistent instantiations of a data image. In other examples of dynamic adaptation of an SOA, no such need for consistency between elements within the resource ensembles for distinct ESCs exists.

Another example of the method described here relates to automatic disaster recovery and/or high-availability fail-over between resources within distinct ESCs by virtue of veiling and unveiling of point-in-time consistent resources within the source and target ESC resource ensembles in response to pre-tested stress states corresponding to different failure conditions.

Yet another example involves load balancing across distinct ESCs by virtue of veiling and unveiling resources within the resource ensembles of the ESCs. Depending on whether the resources involved in the load balancing require access to shared consistent data, there may or may not be consistency between data images within the respective resource ensembles.

Immaterial modifications may be made to the embodiments described here without departing from what is covered by the claims. In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

What is claimed is:

1. A method of coordinating transitions between instantiations of a service on two or more distinct extended service containers, the method comprising:
   establishing a persistent replication relationship between an active data image of a source virtual machine within a source extended service container and a corresponding veiled replica data image of the source virtual machine within a target extended service container, the veiled replica data image being veiled from a target server cluster associated with the target extended service container by suspending a guest operating system of the target server cluster or fencing the veiled replica data image, in which the active data image comprises disk images, an associated memory image, and a processor state; and
   updating the veiled replica data image with the active data image by periodic transmission and application of update data representing selected changes made in the active data image to and only to the corresponding veiled replica data image;
   the method further comprising a coordinated sequences of steps that emulates the effect of transferring the source virtual machine from the source extended service container to the target extended service container by:
   transferring and applying changes made to the active data image of the source virtual machine within the source extended service container to the corresponding suspended replica data image within the target extended service container;
   veiling an active instantiation of the source virtual machine within the source extended service container;
   unveiling the corresponding veiled replica data image of the source virtual machine within the target extended service container to activate the veiled replica data image; and
   mounting the source virtual machine within the target extended service container.

2. The method of claim 1 further comprising, after an initial transfer has occurred from a source extended service container to a target extended service container, the steps of transferring and applying changes from a newly active data image in the active target extended service container to a corresponding veiled replica data image in the source extended service container.

3. The method of claim 1 further comprising unveiling the veiled replica data image within the target extended service container while continuing active service of the source virtual machine in the source extended service container to effect virtual machine cloning.

4. The method of claim 1 in which only the active disk image in the source extended service container is synchronized with a remote disk image in the target extended service container.

5. The method of claim 1 in which the persistent replication relationship is between disk images of virtualized software applications.

6. The method of claim 1 in which the veiled replica data image comprises a disk image of virtualized software applications and their associated memory image, and processor state.

7. The method of claim 1 in which veiling the replica data image of the source virtual machine within a target extended service container from the target cluster associated with the target extended service container comprises suspending the replica data image through a target cluster's management system.

8. The method of claim 1 in which veiling the replica data image of the source virtual machine within a target extended service container from the target cluster associated with the target extended service container comprises fencing the veiled replica data image, which fencing is carried out by de-activating a switch port or network interface card.

* * * * *